United States Patent
Oroskar et al.

(10) Patent No.: US 9,794,416 B1
(45) Date of Patent: Oct. 17, 2017

(54) METHOD AND SYSTEM FOR MAINTAINING DEVICE SERVICE IN A NETWORK

(71) Applicant: Sprint Spectrum L.P., Overland Park, KS (US)

(72) Inventors: Siddharth S. Oroskar, Overland Park, KS (US); Jasinder P. Singh, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 98 days.

(21) Appl. No.: 14/845,598

(22) Filed: Sep. 4, 2015

(51) Int. Cl.
*H04W 36/00* (2009.01)
*H04M 7/00* (2006.01)
*H04W 76/04* (2009.01)
*H04L 29/06* (2006.01)
*H04W 88/08* (2009.01)

(52) U.S. Cl.
CPC ......... *H04M 7/006* (2013.01); *H04W 76/046* (2013.01); *H04W 88/08* (2013.01)

(58) Field of Classification Search
CPC . H04W 28/24; H04W 88/06; H04W 28/0268; H04W 76/046
USPC ........................................ 370/329, 230, 331
See application file for complete search history.

(56) References Cited

U.S. PATENT DOCUMENTS

| | | | | |
|---|---|---|---|---|
| 2013/0286853 | A1* | 10/2013 | Shi ........................ | H04W 24/02 370/242 |
| 2014/0099952 | A1* | 4/2014 | Bhatnagar ............. | H04W 48/02 455/435.2 |
| 2014/0348064 | A1 | 11/2014 | Jeong et al. | |
| 2015/0282012 | A1* | 10/2015 | Baek ................. | H04W 36/0022 370/331 |
| 2016/0262058 | A1* | 9/2016 | Jeong .................... | H04W 60/00 |

* cited by examiner

*Primary Examiner* — Charles C Jiang
*Assistant Examiner* — Will Lin (57) ABSTRACT

Disclosed herein is a method and corresponding system for managing communication in a first network, where the first network is interconnected with a fallback network. The first network may detect, when a user equipment device (UE) served by a base station of the first network seeks to initiate a voice call, the UE will transition from being served by the first network to be served by the fallback network in order to initiate the voice call directly via the fallback network rather than initiate the voice call via the first network. In response to detecting this, and further in response to the base station not supporting signaling between the UE and the fallback network, the first network may cause the UE to not transition to be served by the fallback network and to instead stay served by the base station.

20 Claims, 3 Drawing Sheets

---

A FIRST RAN DETECTS THAT, WHEN A UE SERVED BY A BASE STATION OF THE PLURALITY SEEKS TO INITIATE A VOICE CALL, THE UE WILL TRANSITION FROM BEING SERVED BY THE FIRST RAN TO BE SERVED BY THE FALLBACK RAN IN ORDER TO INITIATE THE VOICE CALL DIRECTLY VIA THE FALLBACK RAN RATHER THAN INITIATE THE VOICE CALL VIA THE FIRST RAN — 50

IN RESPONSE TO THE DETECTION, AND FURTHER IN RESPONSE TO THE BASE STATION NOT SUPPORTING SIGNALING BETWEEN THE UE AND THE FALLBACK NETWORK THAT WILL SERVE THE UE WITH THE VOICE CALL, THE FIRST RAN CAUSES THE UE TO NOT TRANSITION TO BE SERVED BY THE FALLBACK RAN AND TO INSTEAD STAY SERVED BY THE BASE STATION — 52

METHOD AND SYSTEM FOR MAINTAINING DEVICE SERVICE IN A NETWORK

BACKGROUND

A typical radio access network (RAN) includes one or more base stations, each radiating to define a respective coverage area, such as a cell and cell sector, in which user equipment devices (UEs) such as cell phones, tablet computers, tracking devices, embedded wireless modules, and other wirelessly equipped communication devices, can operate. Further, each base station of the RAN may then be coupled or communicatively linked with network infrastructure such as a switch or gateway that provides connectivity with one or more transport networks, such as the public switched telephone network (PSTN) and/or the Internet for instance. With this arrangement, a UE within coverage of the RAN may thus engage in air interface communication with a base station and thereby communicate via the base station with various remote network entities or with other UEs served by the RAN.

In general, a RAN may operate in accordance with a particular air interface protocol or radio access technology, with communications from a base station to UEs defining a downlink or forward link and communications from the UEs to the base station defining an uplink or reverse link. Examples of existing air interface protocols include, without limitation, Orthogonal Frequency Division Multiple Access (OFDMA) (e.g., Long Term Evolution (LTE) or Wireless Interoperability for Microwave Access (WiMAX)), Code Division Multiple Access (CDMA) (e.g., 1×RTT and 1×EV-DO), Global System for Mobile Communication (GSM), WI-FI, and BLUETOOTH. Each protocol may define its own procedures for registration of UEs, initiation of communications, handover between coverage areas, and functions related to air interface communication.

In accordance with the air interface protocol, each of the coverage areas of such a RAN may operate on one or more carrier frequencies and may define a number of air interface channels for carrying information between the base station and UEs. By way of example, each coverage area may define a pilot channel, reference channel or other resource on which the base station may broadcast a pilot signal, reference signal, or the like that UEs may detect as an indication of coverage and may measure to evaluate coverage strength. Further, each coverage area may define a downlink control channel for carrying system information, page messages, and other control signaling from the base station to UEs, and an uplink control channel for carrying service requests and other control signaling from UEs to the base station, and each coverage area may define downlink and uplink traffic channels or the like for carrying bearer traffic between the base station and UEs.

When a UE initially enters into coverage of a RAN (e.g., powers on or moves into coverage of the RAN), the UE may detect a reference signal and read system information broadcast from a base station and may engage in a process to register itself to be served by the base station and generally by the RAN. For instance, the UE may transmit an attach message on an uplink control channel to the base station, and the base station and/or supporting infrastructure may then responsively authenticate and authorize the UE for service, establish a record indicating where in the RAN the UE is operating, establish local profile or context records for the UE, and provide an attach accept message to the UE. Thereafter, the UE may then be served by the RAN in an idle mode or a connected/active mode. In the idle mode, the UE may monitor a downlink control channel to detect page messages and other information regarding incoming communications and may similarly transmit uplink control signaling to initiate communications or for other reasons. And in the connected/active mode, the UE may have particular traffic channel resources assigned by the RAN, which the UE may use to engage in communication of bearer traffic and the like.

When a UE is served in a particular base station coverage area, the UE may also regularly monitor the reference signal strength in that coverage area and in other coverage areas of the RAN, in an effort to ensure that the UE operates in the best (e.g., strongest) coverage area. If the UE detects threshold weak coverage from its serving coverage area and sufficiently strong coverage from another coverage area, the UE may then engage in a handover process by which the UE transitions to be served by the other coverage area. In the idle mode, the UE may do this autonomously and might re-register in the new coverage area. Whereas, in the connected/active mode, the UE may regularly report signal strengths to its serving base station when certain thresholds are met, and the base station and/or supporting infrastructure may work to hand the UE over to another coverage area.

Some wireless communication systems may encompass multiple separate but interconnected RANs, such as a first RAN that provides high speed data communications and a second RAN (i.e., a "fallback" RAN) that provides traditional telephony service, each RAN operating in accordance with a different air interface protocol. Such a hybrid system may be configured to support an inter-RAN fallback process in which the first RAN passes various signaling, such as pre-registration signaling and call-setup signaling, between the fallback RAN and UEs served by the first RAN in order to facilitate transition of UEs from being served by the first RAN to being served with voice calls by the fallback RAN. For instance, a hybrid system that includes an LTE RAN for data communications and a circuit-switched RAN, such as a CDMA RAN (or GSM RAN or the like), for legacy telephone service may support an example inter-RAN fallback process referred to as "circuit-switched fallback" (CSFB). With such an arrangement, a UE may be programmed to scan for and attach with the LTE RAN by default and to then register with the CDMA RAN by engaging in pre-registration signaling through the LTE RAN. In particular, after the UE attaches with an LTE base station, the UE may then transmit to the LTE base station a CDMA pre-registration request message, and that message may pass through the LTE RAN to the CDMA RAN, leading to pre-registration of the UE with the CDMA RAN. Thereafter, when the UE has a voice call to place or the CDMA RAN has a voice call to connect to the UE, call-setup signaling may similarly pass between the UE and the CDMA RAN via the LTE RAN, at which point the UE may then conveniently switch over to be served by a CDMA base station and to engage in the voice call.

In a hybrid system, a UE may be arranged to support both service provided by the first RAN and service provided by the fallback RAN, and further might be arranged to engage in signaling with the fallback RAN via the first RAN to facilitate transition of the UE from being served by the first RAN to being served with voice calls by the fallback RAN. For instance, such a UE may include both a first radio for being served by the first RAN and a second radio for being served by the fallback RAN, and may also include program logic that allows the UE to engage in the inter-RAN fallback process described above. A UE that is arranged in this manner may be referred to herein as a UE that supports the inter-RAN fallback process. In the context of an LTE/CDMA hybrid system, for instance, such a UE may be referred to herein as a "CSFB-capable" UE. Further, when a base station of the first RAN is arranged to pass signaling between the UE and the fallback network that will serve the UE with a voice call as described above, such a base station may be referred to as a base station that supports the inter-RAN fallback process or a base station that supports CSFB.

OVERVIEW

Unfortunately, in some scenarios, a UE arranged to support the inter-RAN fallback process described above may be served by a base station that does not support the inter-RAN fallback process. The base station may not support the inter-RAN fallback process for various reasons. For example, if the base station experiences a threshold extent of failure (e.g., a quantity of recent failures that exceeds a predefined threshold) of the inter-RAN fallback process with respect to one or more UEs served by the base station, the base station may set itself (or the first RAN may set the base station) to not support the inter-RAN fallback process for a certain period of time. As another example, if the base station is under maintenance, engineers that are working on the base station may change the base station's operational parameters so that the base station will not support the inter-RAN fallback process for a certain period of time.

In these scenarios, the UE may detect that the base station does not support the inter-RAN fallback process and, instead of engaging in signaling with the base station to initiate voice calls to be served by the fallback RAN, the UE may responsively leave service of the first RAN altogether, transitioning to be served instead directly by the fallback RAN, and operating via the fallback RAN for an extended period of time, such as thirty minutes, an hour, or longer. In practice, the UE may leave service of the first RAN in this manner when the UE currently has a voice call to initiate, or may leave service of the first RAN proactively so that the UE can later initiate a voice call served directly by the fallback RAN. During this extended period of time, however, the fallback RAN may provide the UE with poorer or otherwise less desirable user experience than the UE would have received from the first RAN.

Disclosed herein is a method and system to help manage wireless communications in a hybrid system, particularly in a scenario in which a UE that is arranged to support the inter-RAN fallback process attempts to detach from a base station that does not support the inter-RAN fallback process and leave service of the first RAN altogether, as discussed above. Namely, in the event that this occurs, the UE will be directed to instead continue being served by the base station so that the UE will not leave service of the first RAN and so that the UE can then initiate voice calls via the first RAN. In accordance with the disclosure, the first RAN may detect that, when the UE served by the base station seeks to initiate a voice call, the UE will transition from being served according to the first air interface protocol (e.g., LTE) by the first RAN to be served according to the second air interface protocol (e.g., CDMA) by the fallback RAN in order to initiate the voice call directly via the fallback RAN rather than initiate the voice call via the first RAN. In response to detecting this, and further in response to the base station not supporting the inter-RAN fallback process, the first RAN will cause the UE to not transition to be served by the fallback RAN and to instead stay served by the base station. As a result, the UE may receive a more desirable user experience while served by the first RAN than the UE would have received while served directly by the fallback RAN. And further, while served by the first RAN, the UE can initiate voice calls using voice service (e.g., voice over Internet Protocol (VoIP) service).

Accordingly, in one respect, disclosed is a method operable by a first RAN comprising a plurality of base stations each configured to provide a respective coverage area in which to serve UEs according to a first air interface protocol, where the first RAN is interconnected with a fallback RAN configured to serve UEs according to a second air interface protocol. The method involves the first RAN detecting that, when a UE served by a base station of the plurality seeks to initiate a voice call, the UE will transition from being served according to the first air interface protocol by the first RAN to be served according to the second air interface protocol by the fallback RAN in order to initiate the voice call directly via the fallback RAN rather than initiate the voice call via the first RAN, wherein the base station does not support signaling between the UE and the fallback network that will serve the UE with the voice call. In response to detecting that, when the UE seeks to initiate the voice call, the UE will transition from being served according to the first air interface protocol by the first RAN to be served according to the second air interface protocol by the fallback RAN in order to initiate the voice call directly via the fallback RAN rather than initiate the voice call via the first RAN, and further in response to the base station not supporting signaling between the UE and the fallback network that will serve the UE with the voice call, the first RAN causes the UE to not transition to be served by the fallback RAN and to instead stay served by the base station.

In an example implementation of the disclosed method, the first RAN may detect that the UE is operable to engage in voice calls using VoIP service and use this detection as an additional basis for causing the UE to not transition to be served by the fallback RAN and to instead stay served by the base station. To facilitate this detection in practice, in the registration signaling process noted above, or at a later time in some other manner, the UE may convey to the first RAN an indication that the UE is operable to engage in VoIP calls. Alternatively, the first RAN may refer to a profile record that the first RAN established and stored for the UE as noted above, where the profile record includes data indicating that the UE is operable to engage in VoIP calls. As such, the first RAN may cause the UE to stay served by the first RAN by transmitting to the UE a directive that causes the UE to (i) not transition to be served by the fallback RAN and to instead stay served by the base station and also to (ii) set itself to engage in voice calls using VoIP service.

Accordingly, in another respect, disclosed is a method for managing wireless communication service. The method may involve a first RAN providing a plurality of base stations each configured to provide a respective coverage area in which to serve UEs according to a first air interface protocol, where the first RAN is interconnected with a fallback RAN configured to serve UEs according to a second air interface protocol. Further, the method may involve the first RAN detecting that, when a UE served by a base station of the plurality seeks to initiate a voice call, the UE will transition from being served according to the first air interface protocol by the first RAN to be served according to the second air interface protocol by the fallback RAN in order to initiate the voice call directly via the fallback RAN rather than initiate the voice call via the first RAN, where the base station does not support an inter-RAN fallback process in which the first RAN passes signaling between the fallback RAN and UEs served by the first RAN to facilitate transition of UEs from being served according to the first air interface protocol by the first RAN to being served with voice calls according to the second air interface protocol by the fallback RAN. (For instance, the first RAN may detect this at the time the UE seeks to initiate such a call, or the first RAN may detect this in advance of the UE seeking to initiate such a call.)

The method may then involve, responsive to detecting that, when the UE seeks to initiate the voice call, the UE will transition from being served according to the first air interface protocol by the first RAN to be served according to the second air interface protocol by the fallback RAN in order to initiate the voice call directly via the fallback RAN rather than initiate the voice call via the first RAN, and further responsive to the base station not supporting the inter-RAN fallback process, the first RAN causing the UE to (i) not transition to be served by the fallback RAN and to instead stay served by the base station and (ii) set itself to engage in the voice call using VoIP service.

Further, in another respect, disclosed is a RAN comprising a plurality of base stations each operable to provide a respective coverage area in which to serve UEs according to a first air interface protocol, where the RAN has a communication interface with a fallback RAN, wherein the RAN is configured to pass CSFB signaling, via the communication interface, between the fallback RAN and UEs served by the RAN, to facilitate a CSFB process in which UEs transition from being served according to the first air interface protocol by the RAN to being served with voice calls according to a second air interface protocol by the fallback RAN, and where the first air interface protocol is different than the second air interface protocol.

The RAN further comprises a controller configured to detect that, when a UE served by a base station of the plurality seeks to initiate a voice call, the UE will transition from being served according to the first air interface protocol by the RAN to be served according to the second air interface protocol by the fallback RAN in order to initiate the voice call directly via the fallback RAN rather than initiate the voice call via the RAN, wherein the base station does not support the CSFB process. And the controller is further configured to transmit to the UE a directive for causing the UE to (i) not transition to be served by the fallback RAN and to instead stay served by the base station and (ii) set itself to engage in the voice call using VoIP service, where the transmission of the directive is performed in response to detecting that, when the UE seeks to initiate the voice call, the UE will transition from being served according to the first air interface protocol by the RAN to be served according to the second air interface protocol by the fallback RAN in order to initiate the voice call directly via the fallback RAN rather than initiate the voice call via the RAN, and further in response to the base station not supporting the CSFB process.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present method and system will be described by way of example in the context of a hybrid LTE/CDMA communication system that supports CSFB. However, it should be understood that principles described herein can apply as well in numerous other contexts, such as in numerous other RAN arrangements, and with various other protocols or combination of protocols. Further, it should be understood that the various arrangements and processes described herein are set forth for purposes of example only, and that other arrangements and elements (e.g., machines, interfaces, functions, orders of elements, etc.) can be added or used instead and some elements may be omitted altogether. In addition, those skilled in the art will appreciate that many of the elements described herein are functional entities that may be implemented as discrete components or in conjunction with other components, in any suitable combination and location, and that various disclosed functions can be implemented by any combination of hardware, firmware, and/or software, such as by one or more processing units programmed to execute computer instructions for instance.

Still further, the present method will be described herein as performed by a base station, namely an LTE eNodeB. However, it will be understood that the present method may be performed in whole or in part by one or more other RAN entities, such as a network controller (e.g., a mobility management entity (MME) of an LTE RAN), and may be performed by such RAN entities in conjunction with each other or in conjunction with a base station.

Figure 1:
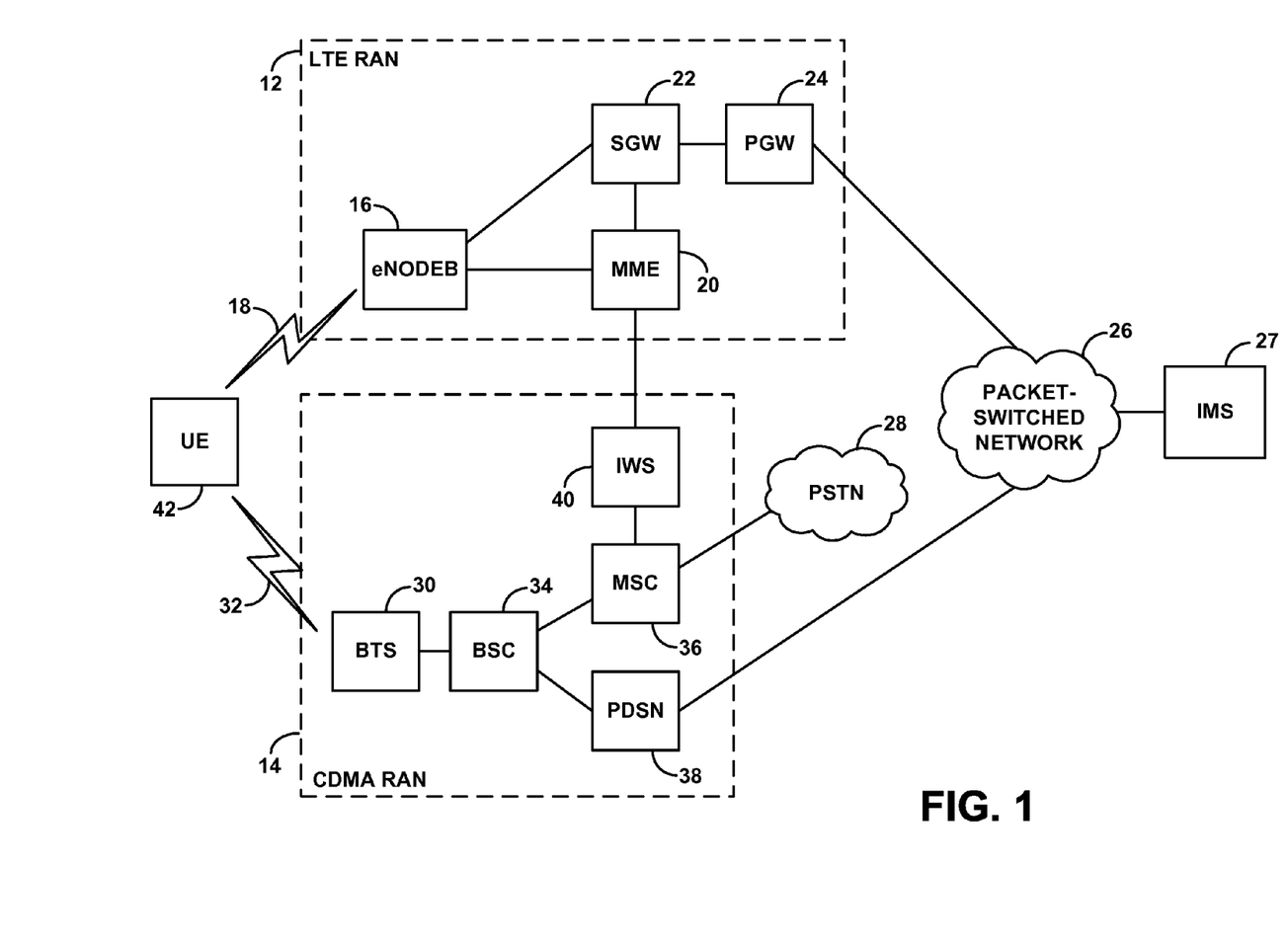
FIG. 1 is a simplified block diagram of a network arrangement in which aspects of the present disclosure can be implemented.

FIG. 1 is a simplified block diagram of an example system, including an LTE RAN 12 and a CDMA RAN 14, where the CDMA RAN is a fallback network in line with the discussion above. In the example system, the LTE RAN primarily serves UEs with wireless packet data communication service. Whereas the CDMA RAN primarily serves UEs with wireless circuit-switched voice call service but may also provide packet-data communication service and other types of service. These RANs may be owned or operated by a common wireless service provider, which may enable the provider to serve UEs with high speed packet data service (including possibly voice-over-packet service, such as voice over LTE (VoLTE)) through the LTE RAN and traditional cellular voice call service through the CDMA RAN.

The LTE RAN 12 in the example system is shown including a representative LTE base station 16 known as an eNodeB, which includes an antenna structure and associated equipment for providing a respective LTE coverage area 18 in which UEs can be served by the eNodeB on a respective carrier frequency and thus by the LTE RAN. Other eNodeBs (not shown) may exist in this hybrid system as well, each defining their own respective LTE coverage area.

Further, the eNodeB 16 is shown having a communication interface with an MME 20 that functions as a signaling controller for the LTE RAN. Still further, the eNodeB is also shown having a communication interface with a serving gateway (SGW) 22, which is in turn shown having a communication interface with a packet-data network gateway (PGW) 24 that provides connectivity with a packet-switched network 26, and the MME is shown having a communication interface with the SGW. In practice, the illustrated components of the LTE RAN may sit as nodes on a private packet-switched network owned by an operator of the LTE RAN, and thus the various communication interfaces may be logical interfaces through that network.

In addition, shown sitting on or accessible via the packet-switched network 26 is an Internet Multimedia Subsystem (IMS) platform 27. IMS 27 may include various proxy servers and application servers, such as a media server, and may function to provide to UEs served by the LTE RAN packet-based real-time media communication services, such as a VoIP calling service (e.g., VoLTE calls), such as when the UEs subscribe to such services.

The CDMA RAN 14 is shown including a representative CDMA base station 30 known as a base transceiver station (BTS), which includes an antenna structure and associated equipment for providing a CDMA coverage area 32 in which UEs can be served by the BTS and thus by the CDMA RAN. The BTS is then shown in communication with a base station controller (BSC) 34, which is in turn shown in communication with a mobile switching center (MSC) 36 that provides connectivity with the PSTN 28 and in communication with a packet data serving node (PDSN) 38 that provides connectivity with the packet-switched network 26. Other BTSs (not shown) may exist in this hybrid system as well, each defining their own CDMA coverage area.

Further shown in FIG. 1 is an interworking server (IWS) 40, which provides connectivity between the LTE RAN and the CDMA RAN to facilitate exchange of signaling messages (such as CSFB registration and call-setup messages, etc.) between the RANs. The IWS may be provided as an element of either one of the RANs or as an element separate from but connected to each RAN, and in a representative arrangement as shown has a communication interface (e.g., an S102 interface) with the MME of the LTE RAN and a communication interface with the MSC of the CDMA RAN. In practice, the IWS may conveniently facilitate setup of CDMA calls for a UE while the UE is served by the LTE RAN, so that the UE can then seamlessly transition from being served by the LTE RAN to engaging in the calls served by the CDMA RAN. In particular, certain call setup signaling that would normally flow over the CDMA air interface between the UE and a CDMA BTS and in turn between the BTS and the MSC will instead flow over the LTE air interface between the UE and an LTE eNodeB, between the eNodeB and the MME, between the MME and the IWS, and between the IWS and the MSC.

In line with the discussion above, FIG. 1 illustrates a representative UE 42 located within both coverage area 18 of the LTE RAN and coverage area 32 of the CDMA RAN. This UE is a hybrid telephony device (e.g., cell phone or other such device) that is CSFB-capable, meaning that the UE is arranged to support both LTE service and CDMA service, and is further arranged to engage in signaling with the CDMA RAN via the LTE RAN to facilitate transition of the UE from being served by the LTE RAN to being served with voice calls by the CDMA RAN. For instance, a CSFB-capable UE may include both a CDMA radio for being served by the CDMA RAN and a LTE radio for being served by the LTE RAN, and may also include program logic that allows the UE to engage in the CSFB process described above.

In practice with this hybrid system, upon entry into coverage area 18 of the LTE RAN, even though CDMA coverage area 32 exists there too, the UE may detect a reference signal broadcast from eNodeB 16 on a particular carrier frequency, and the UE may responsively engage in an attach process or handover process to register with the LTE RAN on that carrier frequency. For instance, the UE may initially transmit to eNodeB 16 an attach message, and upon receipt of the attach message, eNodeB 16 may forward the attach message to the MME 20, and the MME may then engage in signaling with a home subscriber server (not shown) and perhaps further signaling with the UE, to authorize and authenticate the UE, and may obtain from the home subscriber server various service profile information (i.e., a profile record) for the UE for storage as a local context record for the UE at the MME, the eNodeB, and/or other LTE network elements. The MME may then engage in signaling with the SGW 22 and the eNodeB 16, and the SGW may engage in signaling with the PGW 24. Through all of this signaling and/or subsequently, the MME may coordinate establishment for the UE of one or more bearers extending between the UE and the PGW, each including a radio-bearer portion between the UE and the eNodeB 12 and an access-bearer portion between the eNodeB 12 and the PGW (via the SGW).

In addition, the UE may engage in access signaling and radio resource control (RRC) signaling with the eNodeB 16 to establish for the UE a radio-link-layer connection or "RRC connection" between the UE and the eNodeB on the detected carrier frequency, so that the eNodeB may then serve the UE on that carrier frequency. Further, during the initial attach process and/or later while serving the UE, the eNodeB and UE may engage in RRC configuration messaging and/or other processing to modify or otherwise set the UE's RRC connection. For instance, as part of the bearer establishment signaling, the eNodeB may transmit to the UE a RRC Connection Reconfiguration message to allocate bearer resources for the RRC connection, and the UE may then establish the radio bearer resources and respond to the eNodeB with an RRC Connection Reconfiguration Complete message.

Through the registration signaling process noted above, or at a later point in time the MME (and perhaps the eNodeB, from either the MME or the UE) may learn that the UE is CSFB-capable. For instance, the UE may provide to the MME via the eNodeB profile information indicating that the UE is CSFB-capable. Alternatively, when the MME is authenticating and authorizing the UE for LTE service, the MME may receive such UE profile information from other supporting infrastructure, such as the home subscriber server, and store this information in the context record for the UE. Further, at the same time or at a different time as the MME/eNodeB learns that the UE is CSFB-capable, the MME/eNodeB may also learn that the UE is operable to engage in VoIP calls. For instance, the UE may provide to the MME via the eNodeB profile information indicating that the UE is operable to engage in VoIP calls, or the MME may receive such profile information from other supporting infrastructure during authentication and authorization of the UE.

As noted above, the hybrid system shown in FIG. 1 is arranged to support CSFB operation. In an example of CSFB operation, when the CDMA RAN has a voice call to connect to the UE (i.e., an incoming call to the UE), the CDMA RAN may send a page message (or page message trigger) to the IWS, which the IWS may pass along to the LTE RAN to trigger paging of the UE via the LTE RAN. The LTE RAN may then responsively page the UE by having the eNodeB transmit a CSFB page message to the UE over the RRC connection between the eNodeB and the UE, which may cause the UE to transmit to the eNodeB a CSFB extended service request message. Likewise, when the UE has a voice call to place (i.e., an outgoing call from the UE), the UE may autonomously send a CSFB extended service request message to the eNodeB, and this CSFB extended service request message may pass via the MME and the IWS to the MSC to trigger or facilitate setup of the call.

In response to the CSFB extended service request message, the eNodeB may then inform the UE of CDMA RAN operational parameters and may direct the UE to scan for CDMA coverage. Thus, the UE may then scan for CDMA coverage and may transmit to the eNodeB a CDMA origination request, which the eNodeB may tunnel to the MME, the MME may tunnel to the IWS, and the IWS may tunnel to the MSC. The MSC may then direct the detected CDMA BTS to assign an air interface traffic channel for use by the UE to engage in the call, and the MSC may return to the IWS for transmission ultimately to the UE a traffic channel assignment message directing the UE to use the assigned CDMA traffic channel. The UE may then transition to engage in the call over CDMA, served by the detected CDMA BTS using the assigned CDMA traffic channel.

In this process, when the eNodeB transmits the CDMA traffic channel assignment message to the UE, or at another point in anticipation of, during, or in response to transition of the UE from being served by the LTE RAN to being served with the call by the CDMA RAN, the eNodeB may then transmit to the MME a context release request message that includes a cause code or other data interpretable by the LTE RAN entity to indicate to the LTE RAN that CSFB is the cause of the transition. Receipt of the context release request message may cause the MME to responsively (i) suspend bearer(s) and/or context record(s) that the LTE RAN had allocated for use in serving the UE and (ii) update its stored context record(s) for the UE to include a flag or other indication that the bearer(s) are suspended and that the UE is not currently being served by the LTE RAN.

Furthermore, to facilitate CSFB operation in practice with the arrangement shown in FIG. 1, each eNodeB may be arranged to periodically broadcast as system information an indication of whether the eNodeB currently supports providing CSFB service. For instance, this information may include an LTE "system information block #8" (SIB8) message that specifies information about the CDMA RAN, such as identifiers of CDMA coverage areas homed to the MSC, to enable the UE to scan for coverage of the CDMA RAN as part of the CSFB pre-registration process. Further or alternatively, this information may include a particular flag or other indication in a SIB8 message or the like, such as a "CSFB supported" flag or a "CSFB-RegistrationParam1xRTT" information element for instance, the presence of which indicates eNodeB support for providing CSFB service.

As noted above, however, a given eNodeB may not always support CSFB (i.e., may not pass signaling between the UE and the CDMA RAN that will serve the UE with a voice call). For example, if the eNodeB experiences a threshold extent of CSFB failure (e.g., a quantity of recent CSFB failures that exceeds a predefined threshold) with respect to one or more UEs served by the eNodeB, the LTE RAN may cause the eNodeB to set itself to not support CSFB for a certain period of time. As another example, if the eNodeB is under maintenance, engineers that are working on the eNodeB may change the eNodeB's operational parameters so that the eNodeB will not support CSFB for a certain period of time. Other reasons for the eNodeB's lack of CSFB support are possible as well.

Further, in some scenarios, a CSFB-capable UE may come to be served by an eNodeB that does not support CSFB, either during the registration or attach signaling processes noted above, or at a later point in time. For example, the eNodeB may not support CSFB at the time the UE initially attaches with the eNodeB. As another example, the eNodeB may support CSFB at the time the UE initially attaches with the eNodeB, but for one or more of the reasons discussed above, the eNodeB, while serving the UE, may at a later time set itself (or be manually set by an engineer) to not support CSFB.

As noted above, in these scenarios, the UE may detect, during the registration or attach signaling processes, or at a later point in time, that the eNodeB with which the UE has an RRC connection does not support CSFB. To facilitate this in practice, when the eNodeB does not support CSFB, the LTE RAN may configure the eNodeB to notify UEs that the eNodeB does not support CSFB, such as by configuring the eNodeB to (i) broadcast as part of the SIB8 message an indication that the eNodeB does not support CSFB and/or (ii) stop broadcasting as part of the SIB8 message an indication that the eNodeB supports CSFB. Accordingly, the UE may interpret either SIB8 message as indication that the eNodeB does not support CSFB.

Further, in response to the UE detecting that its serving eNodeB does not support CSFB, instead of engaging in signaling with the eNodeB to initiate voice calls via the LTE RAN, the UE may leave service of the LTE RAN altogether, transitioning to be served instead directly by the CDMA RAN, and operating via the CDMA RAN for an extended period of time (e.g., thirty minutes, an hour, or longer). In practice, the UE may leave service of the LTE RAN in this manner when the UE currently has a voice call to initiate, or may leave service of the LTE RAN proactively so that the UE can later initiate a voice call served directly by the CDMA RAN. During this extended period of time, the CDMA RAN may provide the UE with a quality of user experience that is lower or otherwise less desirable than the quality of user experience that the LTE RAN would have provided to the UE if the UE had continued to be served by the LTE RAN.

Thus, when a CSFB-capable UE that is served by an eNodeB that does not support CSFB attempts to detach from the eNodeB and leave service of the LTE RAN altogether, it may be advantageous for the LTE RAN to provide a mechanism to cause that UE to instead continue being served by the eNodeB so that the UE will not leave service of the LTE RAN and so that the UE can then place voice calls as VoIP calls (e.g., VoLTE calls) via the LTE RAN. In accordance with the present disclosure, the eNodeB may detect that the UE is CSFB-capable and, in response to detecting that the UE is CSFB-capable, and further in response to the eNodeB not supporting CSFB, the eNodeB may cause the UE to not transition to be served by the CDMA RAN and to instead stay served by the eNodeB. As noted above, the eNodeB may engage in this disclosed process at the time the UE seeks to initiate such a voice call, or may proactively engage in this process in advance of the UE seeking to initiate such a voice call and trying to leave LTE service.

In an example implementation of this process, the eNodeB may detect that the UE is CSFB-capable by receiving from the UE profile information indicating that the UE is CSFB-capable and/or by the MME referring to such profile information and notifying the eNodeB that the UE is CSFB-capable. Responsive to this detection, and further in response to the eNodeB not supporting CSFB, the eNodeB may cause the UE to not transition to be served by the CDMA RAN and to instead stay served by the eNodeB. In practice, the eNodeB may cause the UE to operate in this manner by transmitting a directive to the UE that, upon receipt by the UE, may cause the UE to set itself to not transition to be served by the CDMA RAN and to instead stay served by the eNodeB. For instance, the directive may take the form of an RRC Connection Reconfiguration Message or other message including data interpretable by the UE to cause the UE to operate in this manner.

In some implementations of the disclosed process, the eNodeB may at the same time or at some other point determine that the UE is operable to engage in VoIP calls (e.g., the UE is subscribed to VoLTE service provided by the LTE RAN), and the eNodeB may and use this determination as an additional basis for causing the UE to not transition to be served by the CDMA RAN and to instead stay served by the eNodeB. To facilitate this in practice, as noted above, during or after the registration or attach process, the eNodeB may receive from the UE a message that includes profile information indicating that the UE is operable to engage in VoIP calls. For instance, the UE may transmit to the eNodeB an RRC Connection Reconfiguration Complete Message including a flag that indicates to the eNodeB that the UE is operable to engage in VoIP calls. Alternatively, during or after the registration or attach process, the eNodeB may receive such profile information from other supporting infrastructure of the LTE RAN. For instance, the eNodeB may receive from the home subscriber server, via the MME, the UE's profile record that the LTE RAN has established and stored for the UE, where the profile record indicates that the UE is operable to engage in VoIP calls.

In response to determining that the UE is operable to engage in VoIP calls, the eNodeB may cause the UE to stay in LTE service by transmitting to the UE a directive that causes the UE to not transition to be served by the CDMA RAN and to instead stay served by the eNodeB, as noted above. Further, the eNodeB may transmit to the UE, either as part of the same directive or as a separate directive, a directive (e.g., an RRC Connection Reconfiguration message) that causes the UE to set itself to engage in voice calls using VoIP service. As a result, while the UE continues to be served by the eNodeB, the UE can initiate voice calls using VoIP service.

Furthermore, in some implementations of the disclosed process, the eNodeB may cause the UE to stay in LTE service further in response to detecting that the UE is trying to transition from being served by the LTE RAN to be served directly by the CDMA RAN in order to initiate a voice call served by the CDMA RAN. To facilitate this detection in practice, at the time the UE seeks to initiate the voice call or before the UE seeks to initiate the voice call, the eNodeB may receive from the UE (or from the MME or other LTE network infrastructure) a message that includes a cause code indicating to the eNodeB that (i) the UE is trying to transition from being served by the LTE RAN to being served with the voice call by the CDMA RAN, and that (ii) CSFB is the cause of the transition. Further, the cause code may also more particularly indicate to the eNodeB that the eNodeB's lack of CSFB support is the cause for the transition.

This message may take various forms. For example, in line with the CSFB call-setup process discussed above, the message may take the form of a request for the UE to communicate with the CDMA RAN in order to initiate the voice call, such as a CSFB extended service request message that the UE may transmit to the eNodeB when the UE is trying to initiate the voice call. As another example, the message may take the form of a context release request message. Other types of messages are possible as well.

Figure 2:
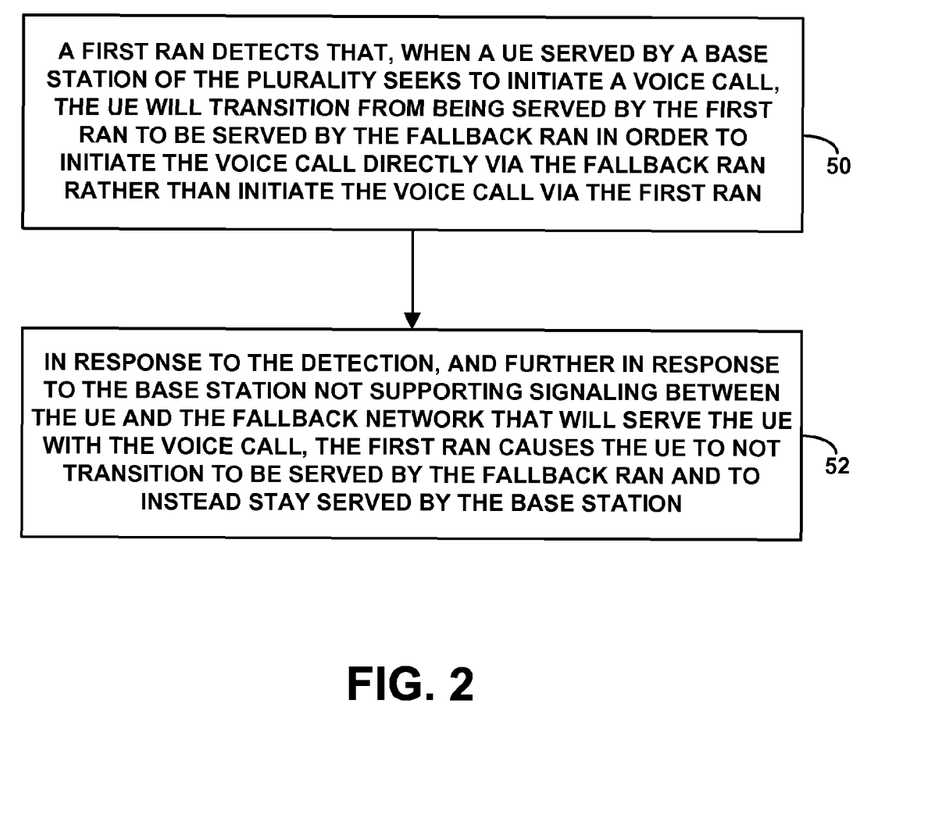
FIG. 2 is a flow chart depicting functions that can be carried out in accordance with the present disclosure.

FIG. 2 is next a flow chart depicting operations of a first RAN such as the LTE RAN 12 in line with the discussion above, which would be configured to provide a plurality of base stations each configured to provide a respective coverage area in which to serve UEs according to a first air interface protocol (e.g., LTE). The first RAN would also be interconnected with a fallback RAN that is configured to serve UEs according to a second air interface protocol, such as the CDMA RAN 14 discussed above.

As shown in FIG. 2, at block 50, the first RAN detects that, when a UE served by a base station of the plurality seeks to initiate a voice call, the UE will transition from being served by the first RAN to be served by the fallback RAN in order to initiate the voice call directly via the fallback RAN rather than initiate the voice call via the first RAN. As noted above, this base station may be a base station that does not support supporting signaling between the UE and the fallback network that will serve the UE with the voice call (e.g., inter-RAN fallback process signaling, such as CSFB signaling). Accordingly, at block 52, in response to the detection, and further in response to the base station not supporting signaling between the UE and the fallback network that will serve the UE with the voice call, the first RAN causes the UE to not transition to be served by the fallback RAN and to instead stay served by the base station.

As noted above, these operations may be performed in whole or in part by at least one network entity of the first RAN, such as by the base station (e.g., an eNodeB of the LTE RAN) and/or by a network controller (e.g., an MME of the LTE RAN). And as further noted above, the first RAN may perform these operations at the time the UE seeks to initiate such a voice call, or may proactively perform these operations in advance of the UE seeking to initiate such a voice call and trying to leave service of the first RAN.

Furthermore, the first RAN may also make a determination that the UE is operable to engage in voice calls using VoIP service (e.g., VoLTE service), and cause the UE to not transition to be served by the fallback RAN and to instead stay served by the base station further in response to this determination. To facilitate this in practice, for instance, the first RAN may either receive from the UE, or refer to in a stored profile record for the UE, an indication that the UE is operable to engage in VoIP calls. Accordingly, the first RAN may cause the UE to (i) not transition to be served by the fallback RAN and to instead stay served by the base station and (ii) set itself to engage in the voice call using the VoIP service.

Moreover, the first RAN may also consider whether the UE is trying to leave service of the first RAN (which the UE may try to do when it has a voice call to place or in advance of having a voice call to place), and use this consideration as a further basis for causing the UE to not transition to be served by the fallback RAN and to instead stay served by the base station. To facilitate this in practice, for instance, the first RAN may receive from the UE a message (e.g., a CSFB extended service request or a context release request) indicating that, because the base station does not support signaling between the UE and the fallback network that will serve the UE with the voice call, the UE is leaving service of the first RAN and transitioning to be served by the fallback RAN in order to initiate the voice call directly via the fallback RAN.

Figure 3:
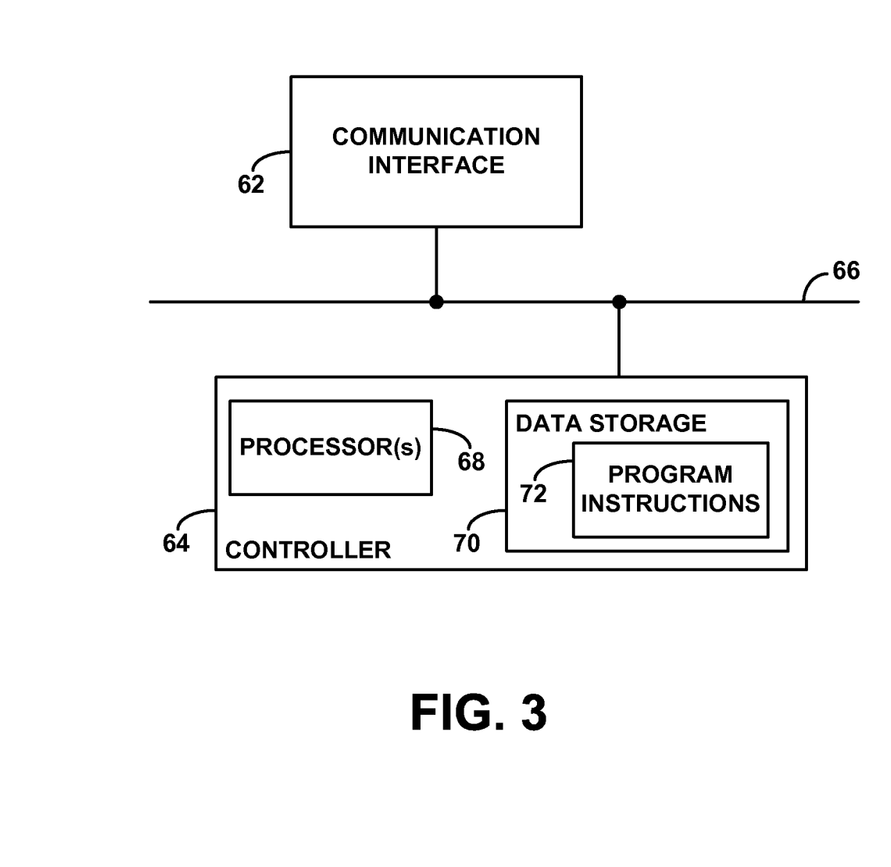
FIG. 3 is a simplified block diagram of example RAN components that are operable in accordance with the disclosure.

Finally, FIG. 3 is a simplified block diagram of example RAN components of a first RAN that operates according to a first air interface protocol (e.g., LTE), such as any given LTE eNodeB and/or MME as discussed above. These components may be included in a single entity of the first RAN (e.g., any given base station or network controller, such as an LTE eNodeB or MME) or distributed among various entities of the first RAN. Further, one or more of these components may each be found in one or more entities of the first RAN.

As shown, the example RAN components include a communication interface 62 through which to engage in communication with a fallback RAN that serves UEs according to a second air interface protocol (e.g., CDMA or GSM) different from the first air interface protocol. In particular, the first RAN may be configured to pass signaling, via the communication interface 62, between the fallback RAN and UEs served by the RAN, to facilitate the inter-RAN fallback process (e.g., CSFB) discussed above. Through this communication interface or one or more other communication interfaces, the RAN entity can also engage in communication with other RAN entities of the first RAN and/or with one or more UEs served by the first RAN.

Further, the example RAN components also include a controller 64 configured to cause one or more entities of the first RAN to carry out various operations described herein. The communication interface and the controller are further shown to be in communication with each other by way of a system bus, network or other connection mechanism 66.

The controller 64 may take various forms, including various combinations of hardware, firmware, and software for instance. By way of example, the controller could comprise at least one processor 68, such as one or more general purpose processors (e.g., microprocessors) and/or one or more special purpose processors (e.g., application specific integrated circuits). The controller could also comprise one or more non-transitory data storage elements (e.g., magnetic, optical, and/or flash storage), such as data storage 70. The data storage could then hold program instructions 72 executable by the processor(s) 68 to carry out various operations described herein. Further, in line with the discussion above, the controller (and/or components thereof) may be included as part of a single entity of the first RAN, or may be included as part of multiple entities of the first RAN that are communicatively linked with each other (e.g., an eNodeB and/or an MME), and may be arranged to control at least a portion of the various operations described herein or other aspects of RAN operation generally.

In an example implementation, the controller 64 may be arranged to (i) detect that, when a UE served by a base station of the plurality seeks to initiate a voice call, the UE will transition from being served according to the first air interface protocol by the RAN to be served according to the second air interface protocol by the fallback RAN in order to initiate the voice call directly via the fallback RAN rather than initiate the voice call via the RAN, wherein the base station does not support CSFB and (ii) in response to the detection, and further in response to the base station not supporting CSFB, transmit to the UE a directive for causing the UE to (i) not transition to be served by the fallback RAN and to instead stay served by the base station and (ii) set itself to engage in the voice call using VoIP service.

Exemplary embodiments have been described above. Those skilled in the art will understand, however, that changes and modifications may be made to these embodiments without departing from the true scope and spirit of the invention.

What is claimed is:

1. In a first radio access network (RAN) comprising a plurality of base stations each configured to provide a respective coverage area in which to serve user equipment devices (UEs) according to a first air interface protocol, wherein the first RAN is interconnected with a fallback RAN configured to serve UEs according to a second air interface protocol, a method comprising:

the first RAN detecting that, when a UE served by a base station of the plurality seeks to initiate a voice call, the UE will transition from being served according to the first air interface protocol by the first RAN to be served according to the second air interface protocol by the fallback RAN in order to initiate the voice call directly via the fallback RAN rather than initiate the voice call via the first RAN, wherein the base station does not support signaling between the UE and the fallback network that will serve the UE with the voice call; and in response to detecting that, when the UE seeks to initiate the voice call, the UE will transition from being served according to the first air interface protocol by the first RAN to be served according to the second air interface protocol by the fallback RAN in order to initiate the voice call directly via the fallback RAN rather than initiate the voice call via the first RAN, and further in response to the base station not supporting signaling between the UE and the fallback network that will serve the UE with the voice call, the first RAN causing the UE to (i) not transition to be served by the fallback RAN and to instead stay served by the base station and (ii) set itself to engage in the voice call using voice over Internet Protocol (VoIP) service.

2. The method of claim 1, further comprising:

before causing the UE to not transition to be served by the fallback RAN and to instead stay served by the base station, the first RAN making a determination that the UE is operable to engage in voice calls using VoIP service, wherein causing the UE to not transition to be served by the fallback RAN and to instead stay served by the base station is further responsive to the first RAN making the determination that the UE is operable to engage in voice calls using the VoIP service.

3. The method of claim 2, wherein causing the UE to not transition to be served by the fallback RAN and to instead stay served by the base station comprises causing the base station to transmit to the UE a directive that causes the UE to (i) not transition to be served by the fallback RAN and to instead stay served by the base station and (ii) set itself to engage in the voice call using the VoIP service.

4. The method of claim 1, wherein detecting that, when the UE seeks to initiate the voice call, the UE will transition from being served according to the first air interface protocol by the first RAN to be served according to the second air interface protocol by the fallback RAN in order to initiate the voice call directly via the fallback RAN rather than initiate the voice call via the first RAN comprises the first RAN receiving from the UE a message including data interpretable by the first RAN to indicate that, when the UE seeks to initiate the voice call, the UE will transition from being served according to the first air interface protocol by the first RAN to be served according to the second air interface protocol by the fallback RAN in order to initiate the voice call directly via the fallback RAN rather than initiate the voice call via the first RAN.

5. The method of claim 1, wherein detecting that, when the UE seeks to initiate the voice call, the UE will transition from being served according to the first air interface protocol by the first RAN to be served according to the second air interface protocol by the fallback RAN in order to initiate the voice call directly via the fallback RAN rather than initiate the voice call via the first RAN comprises the first RAN referring to a profile record stored by the first RAN for the UE, the profile record indicating that, when the UE seeks to initiate the voice call, the UE will transition from being served according to the first air interface protocol by the first RAN to be served according to the second air interface protocol by the fallback RAN in order to initiate the voice call directly via the fallback RAN rather than initiate the voice call via the first RAN.

6. The method of claim 1, further comprising:
before causing the UE to not transition to be served by the fallback RAN and to instead stay served by the base station, the first RAN receiving from the UE a message indicating that, because the base station does not support signaling between the UE and the fallback network that will serve the UE with the voice call, the UE is leaving service of the first RAN and transitioning to be served by the fallback RAN in order to initiate the voice call directly via the fallback RAN,
wherein causing the UE to not transition to be served by the fallback RAN and to instead stay served by the base station is further responsive to the first RAN receiving the message indicating that, because the base station does not support signaling between the UE and the fallback network that will serve the UE with the voice call, the UE is leaving service of the first RAN and transitioning to be served by the fallback RAN in order to initiate the voice call directly via the fallback RAN.

7. The method of claim 1, performed while the base station is serving the UE through a radio-link-layer connection between the base station and the UE.

8. The method of claim 1, wherein the first air interface protocol is an Orthogonal Frequency Division Multiple Access (OFDMA) air interface protocol, and wherein the second air interface protocol is selected from the group consisting of a Code Division Multiple Access (CDMA) air interface protocol and a Global System for Mobile Communications (GSM) air interface protocol.

9. A method for managing wireless communication service comprising:
providing, by a first radio access network (RAN), a plurality of base stations each configured to provide a respective coverage area in which to serve user equipment devices (UEs) according to a first air interface protocol, wherein the first RAN is interconnected with a fallback RAN configured to serve UEs according to a second air interface protocol;
the first RAN detecting that, when a UE served by a base station of the plurality seeks to initiate a voice call, the UE will transition from being served according to the first air interface protocol by the first RAN to be served according to the second air interface protocol by the fallback RAN in order to initiate the voice call directly via the fallback RAN rather than initiate the voice call via the first RAN, wherein the base station does not support an inter-RAN fallback process in which the first RAN passes signaling between the fallback RAN and UEs served by the first RAN to facilitate transition of UEs from being served according to the first air interface protocol by the first RAN to being served with voice calls according to the second air interface protocol by the fallback RAN; and
in response to detecting that, when the UE seeks to initiate the voice call, the UE will transition from being served according to the first air interface protocol by the first RAN to be served according to the second air interface protocol by the fallback RAN in order to initiate the voice call directly via the fallback RAN rather than initiate the voice call via the first RAN, and further in response to the base station not supporting the inter-RAN fallback process, the first RAN causing the UE to (i) not transition to be served by the fallback RAN and to instead stay served by the base station and (ii) set itself to engage in the voice call using voice over Internet Protocol (VoIP) service.

10. The method of claim 9, further comprising:
before causing the UE to (i) not transition to be served by the fallback RAN and to instead stay served by the base station and (ii) set itself to engage in the voice call using the VoIP service, the first RAN receiving from the UE a message indicating that, because the base station does not support the inter-RAN fallback process, the UE is leaving service of the first RAN and transitioning to be served by the fallback RAN in order to initiate the voice call directly via the fallback RAN,
wherein causing the UE to (i) not transition to be served by the fallback RAN and to instead stay served by the base station and (ii) set itself to engage in the voice call using the VoIP service is further responsive to the first RAN receiving the message indicating that, because the base station does not support the inter-RAN fallback process, the UE is leaving service of the first RAN and transitioning to be served by the fallback RAN in order to initiate the voice call directly via the fallback RAN.

11. The method of claim 9, wherein causing the UE to (i) not transition to be served by the fallback RAN and to instead stay served by the base station and (ii) set itself to engage in the voice call using the VoIP service comprises causing the base station to transmit to the UE a directive that causes the UE to (a) not transition to be served by the fallback RAN and to instead stay served by the base station and (b) set itself to engage in the voice call using the VoIP service, and
wherein the directive is a Radio Resource Control (RRC) Connection Reconfiguration message.

12. The method of claim 9, further comprising:
before causing the UE to (i) not transition to be served by the fallback RAN and to instead stay served by the base station and (ii) set itself to engage in the voice call using the VoIP service, the first RAN receiving from the UE a request for the UE to communicate with the fallback network in order to engage in the voice call,
wherein causing the UE to (i) not transition to be served by the fallback RAN and to instead stay served by the base station and (ii) set itself to engage in the voice call using the VoIP service is further responsive to receiving from the UE the request for the UE to communicate with the fallback network in order to engage in the voice call.

13. The method of claim 9, further comprising:
before causing the UE to (i) not transition to be served by the fallback RAN and to instead stay served by the base station and (ii) set itself to engage in the voice call using the VoIP service, the first RAN receiving from the UE a message indicating that the UE is operable to engage in voice calls using the VoIP service,
wherein causing the UE to (i) not transition to be served by the fallback RAN and to instead stay served by the base station and (ii) set itself to engage in the voice call using the VoIP service is further responsive to the first RAN receiving the message indicating that the UE is operable to engage in voice calls using the VoIP service.

14. The method of claim 9, further comprising:
before causing the UE to (i) not transition to be served by the fallback RAN and to instead stay served by the base station and (ii) set itself to engage in the voice call using the VoIP service, the first RAN referring to a profile record stored by the first RAN for the UE, the profile record indicating that the UE is operable to engage in voice calls using the VoIP service, wherein causing the UE to (i) not transition to be served by the fallback RAN and to instead stay served by the base station and (ii) set itself to engage in the voice call using the VoIP service is further responsive to the profile record indicating that the UE is operable to engage in voice calls using the VoIP service.

15. The method of claim 9, performed by at least one entity of the first RAN selected from the group consisting of the base station and a mobility management entity (MME), wherein the base station is an evolved Node-B (eNodeB).

16. A radio access network (RAN) comprising a plurality of base stations each operable to provide a respective coverage area in which to serve user equipment devices (UEs) according to a first air interface protocol, wherein the RAN has a communication interface with a fallback RAN, wherein the RAN is configured to pass circuit-switched fallback (CSFB) signaling, via the communication interface, between the fallback RAN and UEs served by the RAN, to facilitate a CSFB process in which UEs transition from being served according to the first air interface protocol by the RAN to being served with voice calls according to a second air interface protocol by the fallback RAN, and wherein the first air interface protocol is different than the second air interface protocol, the RAN further comprising:

a controller configured to:
  detect that, when a UE served by a base station of the plurality seeks to initiate a voice call, the UE will transition from being served according to the first air interface protocol by the RAN to be served according to the second air interface protocol by the fallback RAN in order to initiate the voice call directly via the fallback RAN rather than initiate the voice call via the RAN, wherein the base station does not support the CSFB process; and
  in response to detecting that, when the UE seeks to initiate the voice call, the UE will transition from being served according to the first air interface protocol by the RAN to be served according to the second air interface protocol by the fallback RAN in order to initiate the voice call directly via the fallback RAN rather than initiate the voice call via the RAN, and further in response to the base station not supporting the CSFB process, transmit to the UE a directive for causing the UE to (i) not transition to be served by the fallback RAN and to instead stay served by the base station and (ii) set itself to engage in the voice call using voice over Internet Protocol (VoIP) service.

17. The RAN of claim 16, wherein the controller is included as part of at least one entity of the RAN selected from the group consisting of the base station and a mobility management entity (MME), wherein the base station is an evolved Node-B (eNodeB).

18. The RAN of claim 16, wherein the controller is further configured to:
  before transmitting the directive to the UE, receive from the UE a message indicating that, because the base station does not support the CSFB process, the UE is leaving service of the first RAN and transitioning to be served by the fallback RAN in order to initiate the voice call directly via the fallback RAN,
  wherein transmitting the directive to the UE is further responsive to the first RAN receiving the message indicating that, because the base station does not support the CSFB process, the UE is leaving service of the first RAN and transitioning to be served by the fallback RAN in order to initiate the voice call directly via the fallback RAN,
  wherein the message is a context release request message.

19. The RAN of claim 16, wherein the controller is further configured to:
  before transmitting to the UE the directive for causing the UE to (i) not transition to be served by the fallback RAN and to instead stay served by the base station and (ii) set itself to engage in the voice call using the VoIP service, receive from the UE a request for the UE to communicate with the fallback network in order to engage in the voice call,
  wherein transmitting the directive is further responsive to receiving from the UE the request for the UE to communicate with the fallback network in order to engage in the voice call, and,
  wherein the request is a CSFB extended service request message.

20. The RAN of claim 16, wherein the controller is further configured to:
  before transmitting the directive to the UE, receive from the UE a message indicating that the UE is operable to engage in voice calls using the VoIP service,
  wherein transmitting the directive to the UE is further responsive to receiving the message indicating that the UE is operable to engage in voice calls using the VoIP service, and
  wherein the message indicating that the UE is operable to engage in voice calls using the VoIP service is a Radio Resource Control (RRC) Connection Reconfiguration Complete message.

* * * * *